(12) United States Patent
Johnson et al.

(10) Patent No.: US 7,358,707 B2
(45) Date of Patent: Apr. 15, 2008

(54) INFORMATION HANDLING SYSTEM INCLUDING A POWER SUPPLY UNIT WITH A POWER CONVERTER FOR SUPPLYING POWER TO MULTIPLE OUTPUTS

(75) Inventors: Brian Patrick Johnson, Cedar Park, TX (US); Brent Alan McDonald, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 11/195,487

(22) Filed: Aug. 2, 2005

(65) Prior Publication Data
US 2007/0046105 A1   Mar. 1, 2007

(51) Int. Cl.
*G05F 1/577* (2006.01)
(52) U.S. Cl. .................. 323/267; 323/282; 363/97
(58) Field of Classification Search ........ 323/282–288, 323/222, 225, 267, 270; 363/15–20, 26, 363/69, 70, 95, 97, 75, 52
See application file for complete search history.

(56) References Cited

U.S. PATENT DOCUMENTS

| | | | | |
|---|---|---|---|---|
| 5,469,349 A | * | 11/1995 | Marinus | 363/21.08 |
| 5,534,768 A | * | 7/1996 | Chavannes et al. | 323/267 |
| 6,777,918 B2 | | 8/2004 | Harrington et al. | |

* cited by examiner

*Primary Examiner*—Rajnikant B. Patel
(74) *Attorney, Agent, or Firm*—Haynes and Boone, LL

(57) ABSTRACT

An information handling system (IHS) includes a system board and a power supply unit, coupled to the system board. The power supply unit includes a power converter for supplying power to a first output and a second output, a switch, coupled to the power converter, for regulating power supplied to the first and the second outputs in response to a duty cycle, and a control circuit, coupled to the switch, for receiving an indication of current level at the second output and in response to the indication of current level at the second output, adjusting the duty cycle.

6 Claims, 2 Drawing Sheets

INFORMATION HANDLING SYSTEM INCLUDING A POWER SUPPLY UNIT WITH A POWER CONVERTER FOR SUPPLYING POWER TO MULTIPLE OUTPUTS

BACKGROUND

The description herein relates generally to information handling systems (IHSs) and more particularly a power supply unit with a power converting for supplying power to multiple outputs.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS typically includes a power supply unit for supplying power to its various components. In one example, a power supply unit includes a power converter (e.g., a transformer based power converter) with multiple outputs. The power supply unit regulates (e.g., by adjusting a duty cycle for a switch) the multiple outputs so that voltage levels for the outputs are maintained within a previously determined range.

Such power converter with multiple outputs may be subject to problems associated with regulating voltage levels of the multiple outputs. For example, with a typical power converter including multiple outputs, the power supply unit regulates voltage levels of the multiple outputs in response to voltage feedback from its primary output. In a situation whereby the primary output has a relatively low load, and one or more of the power supply unit's other (e.g., secondary) outputs have relatively high loads, duty cycle for the switch for regulating the multiple outputs may not be sufficiently high to provide volt-seconds to all outputs to ensure proper regulation.

What is needed is a power supply unit with a power converter having multiple outputs, without the disadvantages discussed above.

SUMMARY

Accordingly, a power supply unit for use with an information handling system (IHS) is provided including providing a power converter for supplying power to a first output and a second output, providing a switch, coupled to the power converter, for regulating power supplied to the first and the second outputs, in response to a duty cycle, and providing a control circuit, coupled to the switch, for receiving an indication of current level at the second output and in response to the indication of current level at the second output, adjusting the duty cycle.

DETAILED DESCRIPTION

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
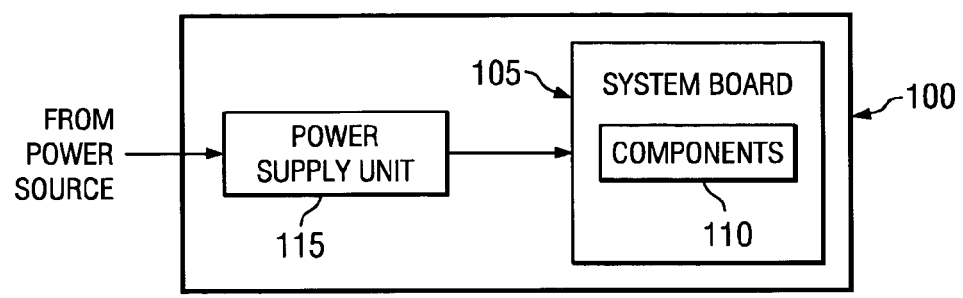
FIG. 1 is a block diagram of an information handling system ("IHS") according to one embodiment.

FIG. 1 is a block diagram of an IHS, indicated generally at 100 according to an illustrative embodiment. The IHS 100 includes a system board 105. The system board 105 includes components (e.g., various devices such as memory devices) 110. Examples of the components 110 are discussed in more detail below in connection with FIG. 2.

The IHS 100 also includes a power supply unit 115 coupled to the system board 115. The power supply unit 115 receives power form a power source, as depicted in FIG. 1, and supplies power to the various components 110 of the system board 105. The power supply unit 115 is discussed in more detail below in connection with FIG. 3.

Figure 2:
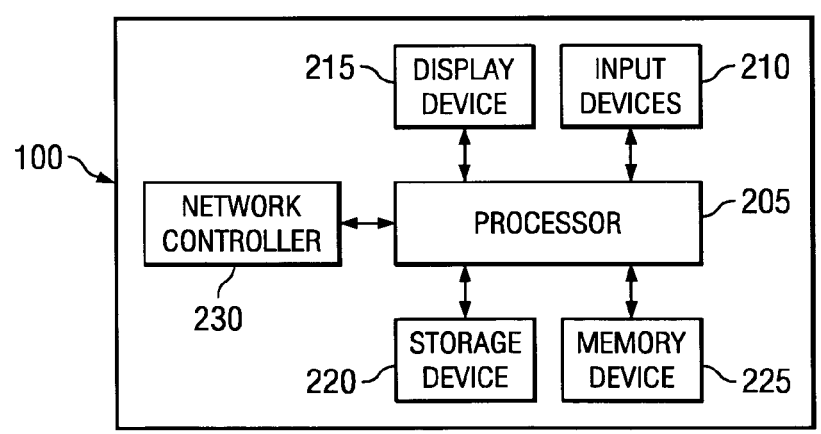
FIG. 2 is a more detailed block diagram of the IHS of FIG. 1.

FIG. 2 is a more detailed block diagram of the IHS 100. The IHS 100 includes a processor 205 (e.g., an Intel Pentium series processor) for executing and otherwise processing instructions, input devices 210 for receiving information from a human user, a display device 215 (e.g., a cathode ray tube (CRT) device, a projector, a liquid crystal display (LCD) device, or a plasma display device) for displaying information to the user, a storage device 220 (e.g., a non-volatile storage device such as a hard disk drive or other computer readable medium or apparatus) for storing information, a memory module 225 (e.g., random access memory (RAM) module and read only memory (ROM) modules), also for storing information, and a network controller 230 for communicating between the IHS 100 and a network. Examples of the memory module 225 include single in-line memory modules (SIMMS) and double in-line memory modules (DIMMS) such as fully-buffered DIMMs (FB-DIMMS).

Each of the input devices 210, the display device 215, the storage device 220, the memory device 225, and the network controller 230 is coupled to the processor 205, and to one another. Also, in one example, the IHS 100 includes various other electronic circuitry for performing other operations of the IHS 100, such as a print device (e.g., a ink-jet printer or a laser printer) for printing visual images on paper.

The input devices 210 include, for example, a conventional keyboard and a pointing device (e.g., a mouse, a roller ball, or a light pen). A user operates the keyboard to input alphanumeric text information to the processor 205, and the processor receives such information from the keyboard. A user also operates the pointing device to input cursor-control information to the processor 205, and the processor 205 receives such cursor-control information from the pointing device.

As discussed above, a power converter with multiple outputs may be subject to problems associated with regulating voltage of such outputs. In one example, such problems are associated with the increase in load current slew rate and decrease in output impedance requirements of such multiple output power converters. Future system processor and video power trends in the industry indicate that such requirements are likely to continually increase and decrease in the future.

One conventional technique for alleviating such problems includes providing excess capacitance in the power converter. However, such technique increases cost and size of the power converter.

Figure 3:
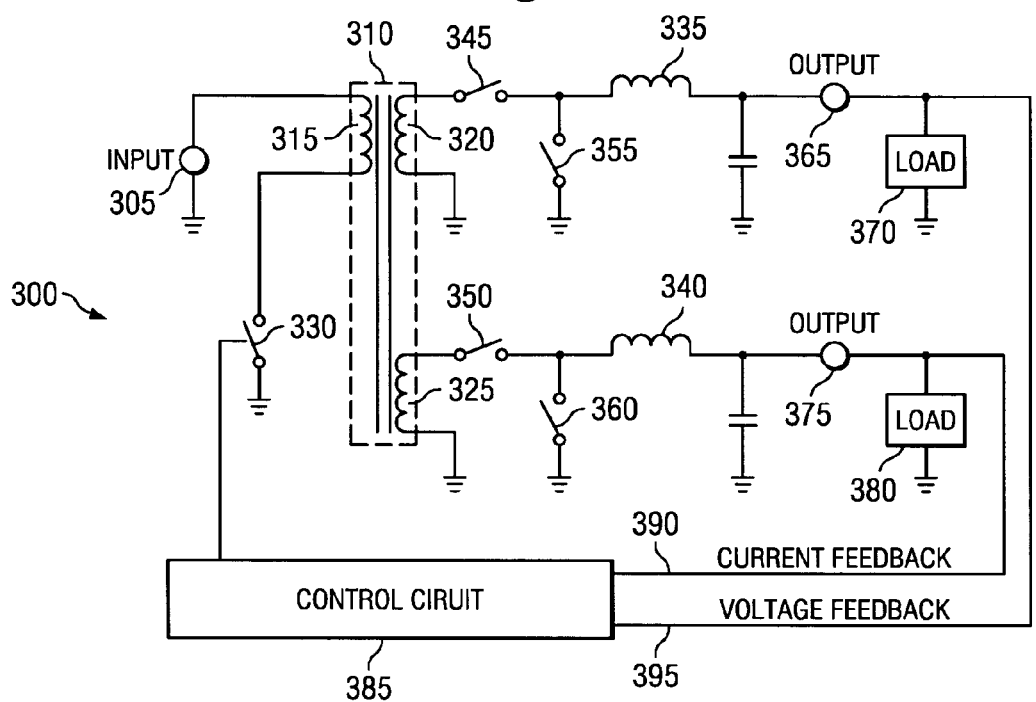
FIG. 3 is a circuit diagram of a switching power regulator, according to one embodiment.

In the illustrative embodiment, a power converter utilizes current mode control to increase volt-second availability to its multiple outputs. Accordingly, FIG. 3 is a circuit diagram of a power converter, indicated generally at 300, according to an illustrative embodiment. The power converter 300 is included in the power supply unit 115 of FIG. 1.

The power converter 300 includes an input 305 and a transformer 310. The transformer 310 includes a primary inductor (i.e., winding) 315 and secondary windings 320 and 325. Also, the power converter 300 includes a switch 330, an inductor 335, and an inductor 340, a switch 345, a switch 350, a switch 355, a switch 360, an output 365, a load 370, an output 375, a load 380, a control circuit 385, a current feedback line 390, and a voltage feedback line 395.

The input 305 is for receiving current from a power source. An example of such power source includes a DC power source (e.g., a battery or a AC/DC rectifier). The transformer 310 is for supplying power to the multiple outputs 365 and 375. In one example, the transformer 310 is a step-down (e.g., 10:1) power converter. In another example, the transformer 310 is a step-up power converter.

In a switching operation, the control circuit 385 repeatedly opens and closes the switch 330 in response to a duty cycle. Such duty cycle is adjustable by the control circuit 385 so that voltage levels at the multiple outputs 365 and 375 are regulated.

The control circuit 385 adjusts the duty cycle in response to voltage level indication received via the voltage feedback line 395 and also in response to current level indication received via the current feedback line 390. As depicted in FIG. 3, the control circuit 385 receives such voltage level indication from the primary output 365 and receives such current level indication from the secondary output 375.

The outputs 365 and 375 are subject to decreases or increases (e.g., drops) in their voltage levels caused by resistance and leakage inductance. Accordingly, in response to the current level received via the current feedback 390, the control circuit 385 adjusts the duty cycle for the switch 330 so that the regulator 300 compensates for such anticipated decreases or increases in the voltage levels.

With a relatively fast transient on load 380, such feedback appears as output "ripple" voltage on the primary output 365. With a conventional switching regulator, feedback of such situation is provided to a control circuit (e.g., a control circuit substantially similar to the control circuit 385) by detecting a voltage level drop, as compared to a reference voltage, at the primary output 365. In response to receiving an indication of such voltage level drop, the control circuit increases its duty cycle. However, in some situations, such technique of detecting the voltage level drop is not reliable (e.g., because of a lag), and causes the voltage level to drop (or rise in the case of a load release) beyond a desired level.

Accordingly, in the illustrative embodiment, FIG. 3, the control circuit 385 receives an indication of current level at the output 375 via the current feedback line 390. In response to the current level at the output 375, the control circuit 385 is capable of adjusting the duty cycle. Notably, utilizing the current level feedback via the current feedback line 390 provides a lower output impedance than merely utilizing a voltage level feedback. Accordingly, the control circuit 385 is capable of more quickly adjusting the duty cycle in response to a change in the level of the load 380 in comparison to adjusting the duty cycle in response merely to a voltage level feedback.

For clarity, FIG. 3 depicts only the two outputs 365 and 375. However, in other embodiments, the power converter 300 may include additional outputs that are substantially similar to the outputs 365 and 375. Accordingly, in embodiments with two or more outputs, the power converter 300 may include additional windings. For such embodiments, the duty cycle is determined according to the following expression: $D=Ve/VRAMP+Iout*GAIN$, where D is the duty cycle of switch 330, Ve is the error voltage of the error amplifier, (see FIG. 4 described below), VRAMP is the ramp voltage used in voltage mode control, Iout is the output current of output 375 and GAIN is the scale factor based on terms such as transformer winding resistance and leakage inductance.

As the control circuit 385 adjusts the duty cycle in response to current level at the output 375, the switch 330 is utilized to provide regulation of levels of voltage at the outputs 365 and 375. In response to switch 330 being on, switches 345 and 350 are on and switches 355 and 360 are off. In response to switch 330 being off, switches 345 and 350 are off and switches 355 and 360 are on. Other implementations of this embodiment may include half-bridge, full-bridge and flyback converters, etc. instead of the forward converter as illustrated. In one example, the control circuit 385 closes the switch 345 and opens the switch 355 to increase voltage level at the output 365 by providing the output 365 with current. In such example, the control circuit 385 opens the switch 345 and closes the switch 355 to decrease voltage level at the output 365 to maintain the output 365.

Similarly, the control circuit 385 closes the switch 350 and opens the switch 360 to increase voltage level at the output 375. Also, the control circuit 385 opens the switch 350 and closes the switch 360 to decrease voltage level at the output 375. In the above examples, the switches 345, 350, 355, and 360 are coupled to the control circuit 385.

Figure 4:
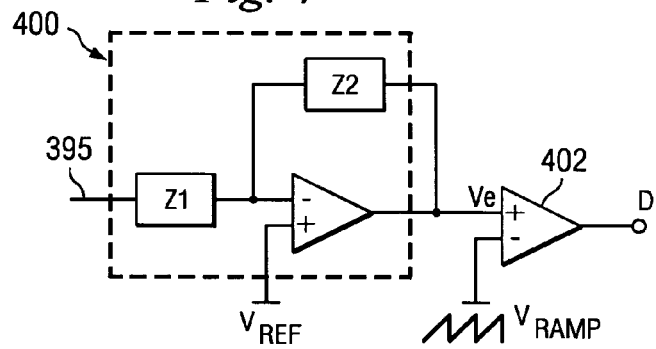
FIG. 4 is an embodiment of a voltage mode control pulse width modulator included in the control circuit of FIG. 3.

In FIG. 4, an op amp 400 includes compensation Z1 and Z2 and VRef which is the target output voltage of output 365. A comparator 402 creates the duty cycle D based on the error voltage Ve and the ramp voltage VRAMP.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A power supply unit comprising:
a power converter for supplying power to a first output and a second output;
a switch, coupled to the power converter, for regulating power supplied to the first and the second outputs, in response to a duty cycle; and
a control circuit, coupled to the switch, for:
receiving an indication of current level at the second output via a current feedback line coupled to the control circuit and the second output;
in response to the indication of current level at the second output, adjusting the duty cycle; and
increasing the duty cycle to compensate for anticipated decreases in voltage levels at the first and the second output;
wherein the switch is a first switch comprising a second and a third switch coupled to the power converter for further regulating the voltage level at the first output;
wherein a fourth and a fifth switch are coupled to the power converter for further regulating the voltage level at the second output; and
wherein the anticipated decreases in voltage levels are caused by one or more of the following: resistance and leakage.

2. The power supply unit of claim 1, wherein the power converter is a transformer based power converter.

3. An information handling system ("IHS") comprising:
a system board; and
a power supply unit, coupled to the system board, including:
a power converter for supplying power to a first output and a second output;
a switch, coupled to the power converter, for regulating power supplied to the first and the second outputs, in response to a duty cycle; and
a control circuit, coupled to the switch, for:
receiving an indication of current level at the second output via a current feedback line coupled to the control current and the second output;
in response to the indication of current level at the second output, adjusting the duty cycle; and
increasing the duty cycle to compensate for anticipated decreases in voltage levels at the first and the second outputs;
wherein the switch is a first switch comprising a second and a third switch coupled to the power converter for further regulating the voltage level at the first output;
wherein a fourth and a fifth switch are coupled to the power converter for further regulating the voltage level at the second output; and
wherein the anticipated decreases in voltage levels are caused by one or more of the following: resistance and leakage.

4. The IHS of claim 3, wherein the power converter is a transformer based power converter.

5. A method comprising:
providing a power converter for supplying power to a first output and a second output;
providing a switch, coupled to the power converter, for regulating power supplied to the first and the second outputs, in response to a duty cycle; and
providing a control circuit, coupled to the switch, for:
receiving an indication of current level at the second output via a current feedback line coupled to the control current and the second output;
in response to the indication of current level at the second output, adjusting the duty cycle; and
increasing the duty cycle to compensate for anticipated decreases in voltage levels at the first and the second outputs;
wherein the switch is a first switch comprising a second and a third switch coupled to the power converter for further regulating the voltage level at the first output;
wherein a fourth and a fifth switch are coupled to the power converter for further regulating the voltage level at the second output; and
wherein the anticipated decreases in voltage levels are caused by one or more of the following: resistance and leakage.

6. The method of claim 5, wherein the power converter is a transformer based power converter.

* * * * *

UNITED STATES PATENT AND TRADEMARK OFFICE
CERTIFICATE OF CORRECTION

| | | |
|---|---|---|
| PATENT NO. | : 7,358,707 B2 | |
| APPLICATION NO. | : 11/195487 | |
| DATED | : April 15, 2008 | |
| INVENTOR(S) | : Brian Patrick Johnson et al. | |

It is certified that error appears in the above-identified patent and that said Letters Patent is hereby corrected as shown below:

Claim 1, Column 5, Line 21; delete "output" and insert --outputs--.

Signed and Sealed this

Third Day of February, 2009

JOHN DOLL
*Acting Director of the United States Patent and Trademark Office*